(12) United States Patent
Nammi et al.

(10) Patent No.: US 10,666,340 B2
(45) Date of Patent: *May 26, 2020

(54) DETERMINING PRECODING COEFFICIENTS FOR FRONTHAUL LINKS IN A CLOUD RADIO ACCESS NETWORK

(71) Applicant: AT&T Intellectual Property I, L.P., Atlanta, GA (US)

(72) Inventors: SaiRamesh Nammi, Austin, TX (US); Aditya Chopra, Austin, TX (US); Arunabha Ghosh, Austin, TX (US); Milap Majmundar, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/441,292

(22) Filed: Jun. 14, 2019

(65) Prior Publication Data

US 2020/0052752 A1 Feb. 13, 2020

Related U.S. Application Data

(63) Continuation of application No. 16/058,667, filed on Aug. 8, 2018, now Pat. No. 10,367,568.

(51) Int. Cl.
*H04K 1/10* (2006.01)
*H04B 7/06* (2006.01)

(52) U.S. Cl.
CPC ........... *H04B 7/066* (2013.01); *H04B 7/0626* (2013.01); *H04B 7/0639* (2013.01); *H04B 7/0691* (2013.01)

(58) Field of Classification Search
CPC .... H04B 7/066; H04B 7/0691; H04B 7/0639; H04B 7/0626
See application file for complete search history.

(56) References Cited

U.S. PATENT DOCUMENTS

| | | |
|---|---|---|
| 7,570,696 B2 | 8/2009 | Maltsev et al. |
| 7,649,955 B2 | 1/2010 | Lin et al. |

(Continued)

FOREIGN PATENT DOCUMENTS

| | | |
|---|---|---|
| AU | 2013327697 A1 | 4/2015 |
| CA | 2 283 859 C | 8/2005 |

(Continued)

OTHER PUBLICATIONS

Shi et al., "CSI Overhead Reduction with Stochastic Beamforming for Cloud Radio Access Networks", URL: http://booksc.org/book/30948199/366418, Wireless Communications (ICC), IEEE International Conference, 2014, pp. 5154-5159.

(Continued)

*Primary Examiner* — Dhaval V Patel
(74) *Attorney, Agent, or Firm* — Amin, Turocy & Watson, LLP

(57) ABSTRACT

A split radio access network is provided that efficiently transmits beamforming coefficients from a distributed baseband unit device to a remote radio unit device to facilitate beamforming at the remote radio unit. The beamforming coefficients can be determined at the baseband unit device and transmitted along with the IQ data (data to be beamformed) to the remote radio unit device. Due to the large number of antenna ports however, there can still be a very large number of coefficients to transmit, and the disclosure provides for a compressed set of coefficients that reduces the overhead signaling requirements. Instead of sending coefficients for every $k_{th}$ antenna port, the system can select a subset of the coefficients corresponding to a set of k antenna ports which can be used by the remote radio unit to approximate the full set of beamforming coefficients.

20 Claims, 10 Drawing Sheets

(56) References Cited

U.S. PATENT DOCUMENTS

| | | |
|---|---|---|
| 7,961,802 B2 | 6/2011 | Li et al. |
| 8,184,052 B1 | 5/2012 | Wu et al. |
| 8,233,556 B2 | 7/2012 | Waters et al. |
| 8,335,167 B1 | 12/2012 | Zhang et al. |
| 8,520,764 B2 | 8/2013 | Khojastepour et al. |
| 8,737,494 B2 | 5/2014 | Kim et al. |
| 8,743,857 B2 | 6/2014 | Li et al. |
| 8,781,017 B2 | 7/2014 | Solomon et al. |
| 8,934,328 B2 | 1/2015 | Shapira et al. |
| 8,982,980 B2 | 3/2015 | Zhang |
| 9,100,074 B1 | 8/2015 | Zhang et al. |
| 9,136,930 B2 | 9/2015 | Son et al. |
| 9,231,303 B2 | 1/2016 | Edelmann et al. |
| 9,281,885 B2 | 3/2016 | Raju et al. |
| 9,485,063 B2 | 11/2016 | Shattil |
| 9,537,556 B2 | 1/2017 | Zhou et al. |
| 9,680,538 B2 | 6/2017 | Xia et al. |
| 9,729,215 B2 | 8/2017 | Rahman et al. |
| 9,793,996 B2 | 10/2017 | Liu et al. |
| 9,838,227 B2 | 12/2017 | Sahin et al. |
| 9,893,774 B2 | 2/2018 | Shattil |
| 9,967,065 B2 | 5/2018 | Nuzman et al. |
| 9,998,310 B2 | 6/2018 | Barbieri et al. |
| 10,009,803 B2 | 6/2018 | Dahod et al. |
| 10,015,034 B1 | 7/2018 | Shattil |
| 10,367,568 B1 * | 7/2019 | Nammi |
| 2005/0286663 A1 | 12/2005 | Poon |
| 2008/0130764 A1 | 6/2008 | Xia et al. |
| 2009/0046807 A1 | 2/2009 | Xia et al. |
| 2013/0114763 A1 * | 5/2013 | Park ............... H04B 7/0413 375/296 |
| 2014/0010319 A1 * | 1/2014 | Baik ............... H04B 7/0413 375/267 |
| 2014/0023190 A1 | 1/2014 | Liang et al. |
| 2017/0099658 A1 | 4/2017 | Shattil |
| 2017/0141828 A1 | 5/2017 | Tosato et al. |
| 2017/0237831 A1 | 8/2017 | Yang et al. |
| 2017/0238361 A1 | 8/2017 | Pawar et al. |
| 2018/0159611 A1 | 6/2018 | Majmundar et al. |
| 2018/0176898 A1 | 6/2018 | Yu et al. |
| 2018/0198511 A1 | 7/2018 | Maamari et al. |

FOREIGN PATENT DOCUMENTS

| | | |
|---|---|---|
| CA | 2 503 248 C | 2/2012 |
| EP | 3 226 496 A1 | 10/2017 |
| KR | 10-1831618 B1 | 4/2018 |
| WO | 93/12590 A1 | 6/1993 |
| WO | 2014/076004 A2 | 5/2014 |
| WO | 2017/040002 A1 | 3/2017 |
| WO | 2017/081207 A1 | 5/2017 |
| WO | 2017/100096 A1 | 6/2017 |
| WO | 2018/009548 A8 | 5/2018 |
| WO | 2018/125686 A2 | 7/2018 |

OTHER PUBLICATIONS

Zhou et al., "Optimized Beamforming and Backhaul Compression for Uplink MIMO Cloud Radio Access Networks", Globecom Workshops (GC Wkshps), IEEE, 2014, pp. 1493-1498.

Zhou et al., "Fronthaul Compression and Transmit Beamforming Optimization for Multi-Antenna Uplink C-RAN", IEEE Transactions on Signal Processing, vol. 64, No. 16, 2016, pp. 1-14.

Garikipati, Krishna Chaitanya, "Towards Scalable Design of Future Wireless Networks", 2016, 171 pages.

Fortuna, Joary Paulo Wanzeller, "FPGA-based Testbed for Fronthaul Signal Compression: Implementation and Validation", URL: http://repositorio.ufpa.br/jspui/bitstream/2011/9001/1/Dissertacao_FPGABasedTestbed.pdf, 2017, 81 pages.

Stephen et al., "Joint Millimeter-Wave Fronthaul and OFDMA Resource Allocation in Ultra-Dense CRAN", URL: https://arxiv.org/pdf/1603.09601, IEEE Transactions on Communications, vol. 65, No. 3, 2017, pp. 1-14.

Patil et al., "Hybrid Data-Sharing and Compression Strategy for Downlink Cloud Radio Access Network", URL: https://arxiv.org/pdf/1806.00673, IEEE Transactions on Communications, 2018, pp. 1-15.

Yang, Tao, "Distributed MIMO Broadcasting: Reverse Compute-and-forward and Signal-space Alignment", IEEE Transactions on Wireless Communications, vol. 16, No. 1, 2017, pp. 1-13.

Peng et al., "Recent Advances in Cloud Radio Access Networks: System Architectures, Key Techniques, and Open Issues", IEEE Communications Surveys & Tutorials, vol. 18, No. 3, 2016, pp. 1-27.

Non-Final Office Action received for U.S. Appl. No. 16/058,667 dated Nov. 6, 2018, 25 pages.

Non-Final Office Action received for U.S. Appl. No. 15/971,578 dated Apr. 8, 2019, 27 pages.

* cited by examiner

DETERMINING PRECODING COEFFICIENTS FOR FRONTHAUL LINKS IN A CLOUD RADIO ACCESS NETWORK

RELATED APPLICATION

The subject patent application is a continuation of, and claims priority to, U.S. patent application Ser. No. 16/058,667 (now U.S. Pat. No. 10,367,568), filed Aug. 8, 2018, and entitled "DETERMINING PRECODING COEFFICIENTS FOR FRONTHAUL LINKS IN A CLOUD RADIO ACCESS NETWORK," the entirety of which application is hereby incorporated by reference herein.

TECHNICAL FIELD

The present application relates generally to the field of mobile communications and, more specifically, to determining precoding coefficients for fronthaul links in a split radio access network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
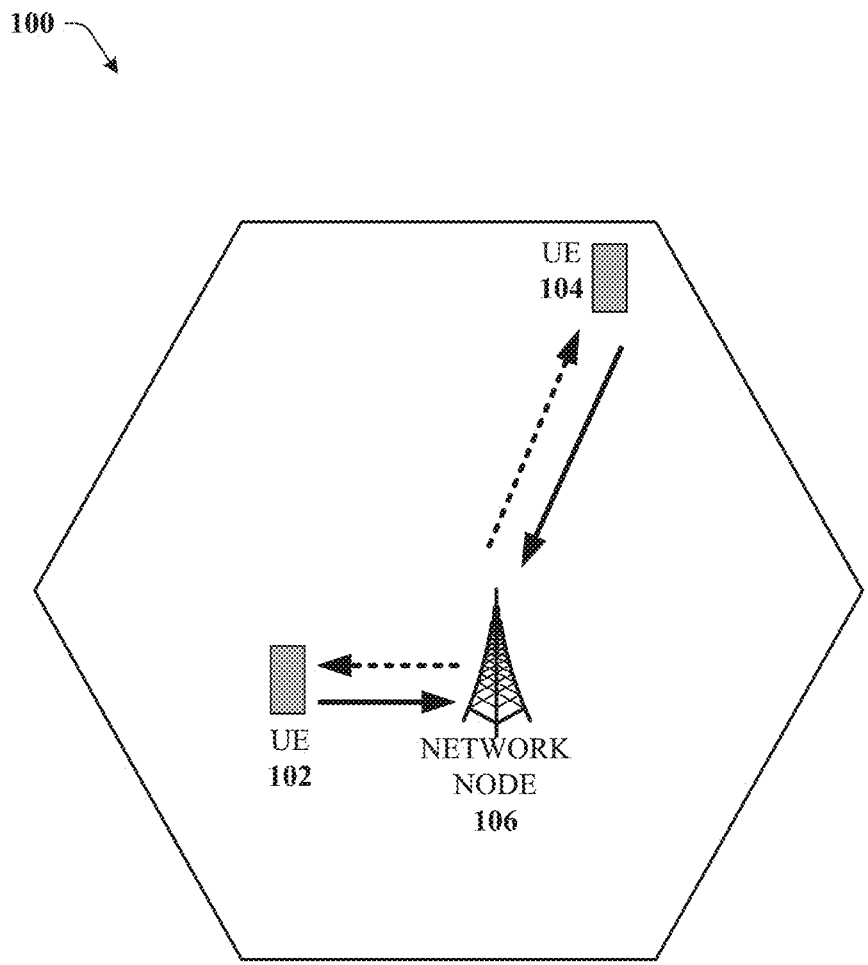
FIG. 1 illustrates an example wireless communication system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for a split radio access network that efficiently transmits beamforming coefficients from a distributed baseband unit device to a remote radio unit device to facilitate beamforming at the remote radio unit. In frequency division multiplexing, the number of antenna ports can be much larger than the number of channel state information reference signal (CSI-RS) ports, so the amount of data transmitted from the baseband unit device to the remote radio unit device can be reduced by performing the digital beamforming at the remote radio unit device. The beamforming coefficients can however be determined at the baseband unit device and transmitted along with the IQ data (data to be beamformed) to the remote radio unit device. Due to the large number of antenna ports however, there can still be a very large number of coefficients to transmit, and the disclosure provides for a compressed set of coefficients that reduces the overhead signaling requirements. Instead of sending coefficients for every $k_{th}$ antenna port, the system can select a subset of the coefficients corresponding to a set of k antenna ports which can be used by the remote radio unit to approximate the full set of beamforming coefficients.

In an embodiment, a distributed baseband unit device can determine the best precoder matrix from the estimated channel from the uplink. Once it determines the channel it will find the coefficients for the linear combination of the basis vectors which are known at the distributed baseband unit as well as at the remote radio unit. In an embodiment, there can be two methods for determining the coefficients. Once it determines the coefficients it will transmit the coefficients using compression techniques. Once the remote radio unit receives the compressed coefficients, it will reconstruct the precoder matrix and applies to the data traffic. In the first embodiment, each combination of a subset M of the basis vectors are precalculated, and the beamforming coefficents for the portion of basis vectors that give the best spectral efficiency and/or throughput metrics are selected. In this way, a portion of the beamforming coefficients are transmitted to the remote radio unit. In the second embodiment, the number M is decided, and then beamforming coefficients that provide optimal M values of a basis vector multiplied by a precoding matrix V.

One of the key design tenants of centralized radio access networks (C-RANs) is to centralize and virtualize the digital baseband processing chain as much as possible. State-of-the-art all-digital massive MIMO systems, however, cannot be deployed in a centralized fashion due to challenges in transporting the digital samples as well as control information for a large number transmission/reception (TRx) chains from a central location to the edge of the network. In frequencies of interest the number of digital chains for massive MIMO (FD-MIMO) can easily be in the range of 64-256 therefore making the burden on the transport network rather difficult to achieve. Without good compression techniques, the throughput requirements for this DU-RU connection can become prohibitively high, requiring the use of multiple fiber optic cables per CU-RU link, as well as requiring large quantities of serial transceivers at the CU and RU, thereby increasing their cost and complexity.

Digital beamforming requires matrix multiplication by a beamforming matrix. In a next generation split RAN architecture, digital beamforming is performed at the remote radio unit, while the beamforming weights are calculated at the digital baseband unit, and transmitted across a wired network to the radio unit, also known as the fronthaul. In this invention the matrix coefficients required for beamforming are replaced by a set of basis function coefficients. This transformation has the ability to significantly reduce the number of bits required to describe the beamforming matrix at a small cost to performance. This eases the throughput requirements of the fronthaul network, reducing the deployment and operational costs of next generation infrastructure.

Reducing the fronthaul throughput requirements while meeting key performance indicators enables the use of fewer serial links per CU-RU connection. This results in a cheaper base-station implementation, as well as cheaper fronthaul implementation between a CU and multiple RUs, lowering the capital expenditures and operating expenditures of deploying a cloud architecture based wireless network.

While reference is generally made throughout the disclosure to transmissions from the baseband unit to the remote radio unit, in other embodiments, the remote radio unit can perform similar compression of the beamforming coefficients when sending data to the baseband unit device.

In various embodiments, a baseband unit device can comprise a processor and a memory that stores executable instructions that, when executed by the processor facilitate performance of operations. The operations can comprise determining a group of beamforming coefficients for a stream of data, wherein the group of beamforming coefficients comprises respective subgroups of beamforming coefficients that correspond to respective basis vectors. The operations can also comprise determining spectral efficiencies associated with portions of the respective subgroups of beamforming coefficients. The operations can also comprise selecting a portion of the respective subgroups of beamforming coefficients with a threshold spectral efficiency of the portions of the respective subgroups of the beamforming coefficients to add to a reduced size group of beamforming coefficients. The operations can also comprise transmitting the reduced size group of beamforming coefficients to a remote radio unit device to facilitate digital beamforming of a transmission to occur at the remote radio unit device.

In another embodiment, method comprises obtaining, by a baseband unit device comprising a processor, beamforming coefficients that are able to facilitate beamforming, by a remote radio unit device of a transmission to be sent to a user equipment device, wherein the beamforming coefficients correspond to respective basis vectors. The method can also comprise obtaining, by the baseband unit device, a spectral efficiency for combinations of portions of the beamforming coefficients, wherein the portions of the beamforming coefficients comprise a defined number of beamforming coefficients. The method can also comprise generating, by the baseband unit device, a reduced size group of beamforming coefficients from a portion of the portions of the beamforming coefficients determined to comprise at least a threshold spectral efficiency of the spectral efficiencies. The method can also comprise facilitating, by the baseband unit device, transmitting the reduced size group of beamforming coefficients to the remote radio unit device via a digital transmission.

In another embodiment, a machine-readable storage medium, comprising executable instructions that, when executed by a processor of a baseband unit device, facilitate performance of operations. The operations can comprise accessing beamforming coefficients that are able to facilitate beamforming, by a remote radio unit device of a transmission to be sent to a user equipment device, wherein the beamforming coefficients correspond to respective basis vectors. The operations can also comprise accessing, by the baseband unit device, a spectral efficiency for each combination of portions of the beamforming coefficients, wherein the portions of the beamforming coefficients comprises a defined number of beamforming coefficients. The operations can also comprise selecting a portion of the portions of the beamforming coefficients with a highest spectral efficiency of the spectral efficiencies to form a reduced size group of beamforming coefficients. The method can also comprise transmitting, by the baseband unit device, the reduced size group of beamforming coefficients to the remote radio unit device via a digital transmission.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. UE 102 can also refer to any type of wireless device that communicates with a radio network node in a cellular or mobile communication system. Examples of UE 102 are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

Figure 2:
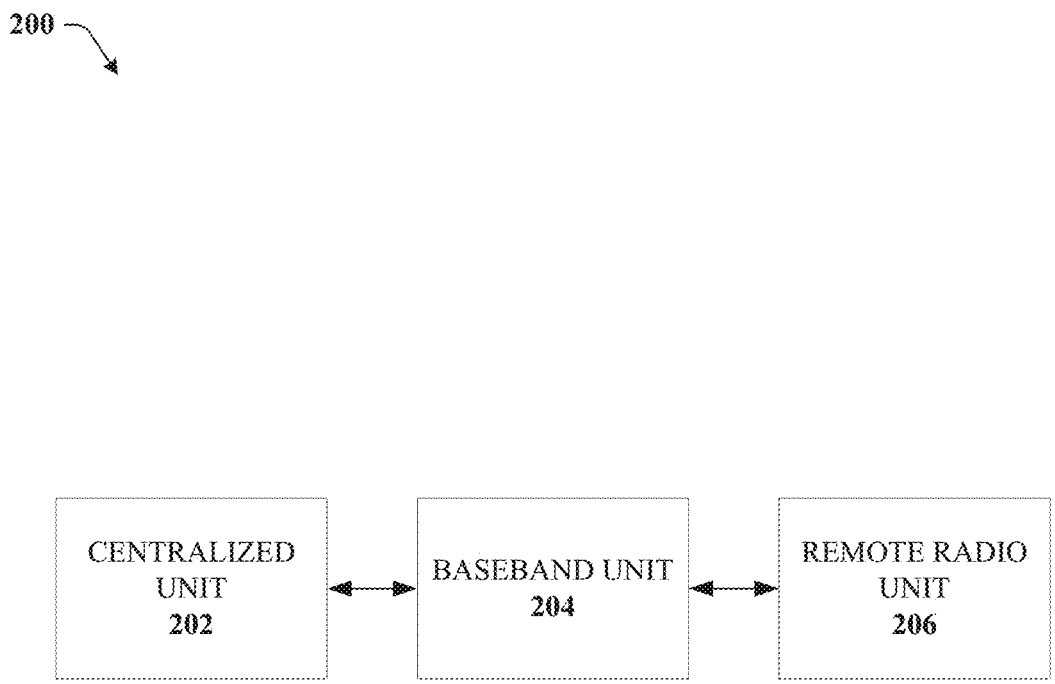
FIG. 2 illustrates an example block diagram showing a split radio access network in accordance with various aspects and embodiments of the subject disclosure.

In an embodiment, the network node 106 can be part of a split radio access network comprising two or more units. This can be shown in more detail in FIG. 2. In an embodiment, there can be a centralized unit (CU) 202 that performs upper level Medium Access Control (MAC), a distributed baseband unit (DU) 204 that performs lower level MAC and physical layer functionality, and a remote radio unit (RU) 206 that can transmit and receive RF signals and converts analog signals to digital signals and vice versa. Each of the CU 202, DU 204, and RU 206 can be linked via a fiber optical network or other high bandwidth front haul network. To reduce complexity and bandwidth, the transmissions sent between the CU 202, DU 204, and RU 206 can be digital, so the RU 206 can receive analog signals and convert the analog RF signals to digital before transmitting to the DU 204. Similarly, the RU 206 can receive a digital transmission comprising the IQ data and beamforming coefficients and perform the digital beamforming, and digital to analog conversion at the RU 206.

The network node 106 can employ beamforming when transmitting to the UE 102 and/or 104. Beamforming is a signal processing technique used in sensor arrays for directional signal transmission or reception. This is achieved by combining elements in an antenna array in such a way that signals at particular angles experience constructive interference while others experience destructive interference.

Beamforming can be used at both the transmitting and receiving ends in order to achieve spatial selectivity. The improvement compared with omni-directional reception/transmission is known as the directivity of the array. In the wireless communications context, a traffic-signaling system for cellular base stations that identifies the most efficient data-delivery route to a particular user, and it reduces interference for nearby users in the process. Depending on the situation and the technology, there are several ways to implement it in 5G networks.

Beamforming can help massive MIMO arrays, which are base stations arrayed with dozens or hundreds of individual antennas, to make more efficient use of the spectrum around them. The primary challenge for massive MIMO is to reduce interference while transmitting more information from many more antennas at once. At massive MIMO base stations, signal-processing algorithms plot the best transmission route through the air to each user. Then they can send individual data packets in many different directions, bouncing them off buildings and other objects in a precisely coordinated pattern. By choreographing the packets' movements and arrival time, beamforming allows many users and antennas on a massive MIMO array to exchange much more information at once. During beamforming, a data stream can be used to generate multiple data streams, each corresponding to an antenna port, and the data streams can each be modified based on a beamforming vector.

Frequency modulated IQ data can have "L" CSI-RS ports, where L is the number of layers associated with the data, and F tones before beamforming A=L×F matrix). After beamforming, the IQ data has P ports (each antenna) and F tones (B=P×F matrix). In digital beamforming, P2 is a P×L matrix where the rows of the matrix correspond to the number of ports, and columns correspond to the number of layers. This means that B=P2×A. In an embodiment of the disclosure then, the beamforming coefficients are compressed by adaptively quantizing each column of the beamforming matrix P2. Each column of P2 is quantized by $Q_1$ bits. $Q_1$ is communicated to the RU at the same time.

Figure 3:
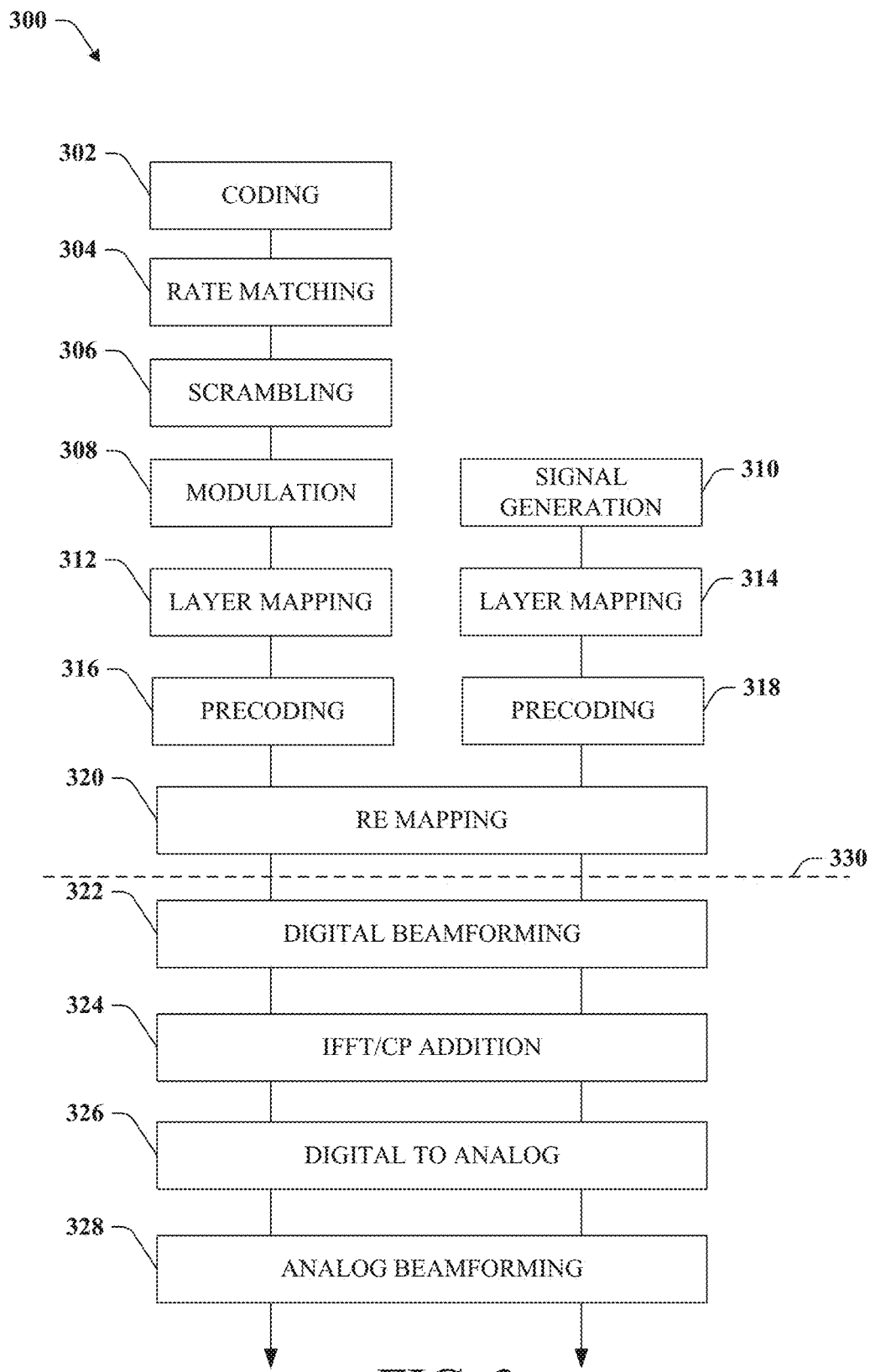
FIG. 3 illustrates an example flowchart for digital beamforming in a split radio access network in accordance with various aspects and embodiments of the subject disclosure.

Turning now to FIG. 3, illustrated is an example flowchart 300 for digital beamforming in a split radio access network in accordance with various aspects and embodiments of the subject disclosure.

In an embodiment, various functionalities can be performed on data channel and control channels (e.g., PBCH) at the baseband unit device such as coding 302, rate matching 304, scrambling 306, and modulation 308, layer mapping 312 and precoding 316. The precoding 316 can be based on precoding matrix information as received from the user equipment device. Similarly, other functionalities related to cell specific signals (e.g., SS, CSI-RS, and UE specific signaling (e.g., DMRS) can be performed at the baseband unit as well, such as signal generation 310, layer mapping 314, and precoding 318. At 320, remapping, the baseband unit can calculate beamforming coefficients that can be used by the remote radio unit to perform beamweighting on the IQ data.

Demarcation line 330 can indicate the activities which above the line 330 are performed at the baseband unit, while the activities below the line 330 are performed at the remote radio unit.

Once the baseband unit sends the beamforming coefficients to the remote radio unit, the remote radio unit can perform digital beamforming 322, IFFT/CP addition 324, Digital to analog conversion 326, and then perform analog beamforming 328 before transmitting the data to the UE.

Figure 4:
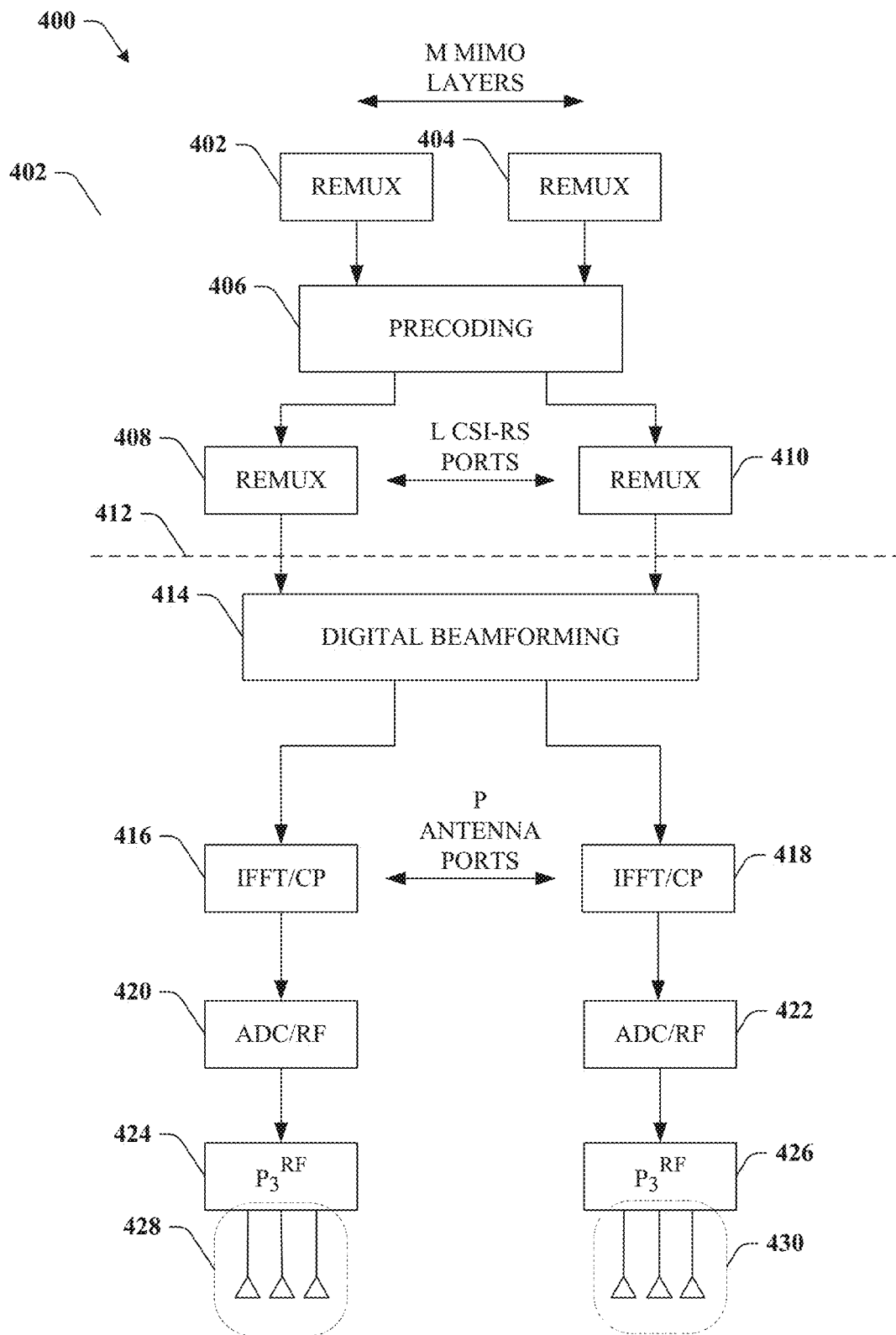
FIG. 4 illustrates an example flowchart for digital beamforming in a split radio access network in accordance with various aspects and embodiments of the subject disclosure.

Turning now to FIG. 4, illustrated is another example flowchart 400 for digital beamforming in a split radio access network in accordance with various aspects and embodiments of the subject disclosure.

In flowchart 400, remultiplexing 402 and 404 can be performed on data streams corresponding to "M" MIMO layers, which can then go through precoding at 406. The output of the precoding 406 can be more remultiplexing 408 and 410 corresponding to L different CSI-RS ports (or layers). These L streams can then be digitally beamformed at 414 and split into data streams relating to P antenna ports. P can be much larger then L, so to reduce the overhead signaling, the digital beamforming 414 is performed at the remote radio unit, while other functionalities above the demarcation line 412 are performed at the baseband unit. IFFT/CP blocks 416 and 418 are applied to the P data streams, then analog to digital conversations 420 and 422 are applied before analog beamforming is performed to the P data streams at 424 and 426 and then the P data streams are transmitted via P antenna ports 428 and 430.

To perform the digital beamforming 414 at the remote radio unit, the remote radio unit receives the IQ data (frequency modulated data) along with the beamforming coefficients. The digital beamforming block uses the beamforming coefficients along with a basis vector matrix to perform the beamforming on each $k_{th}$ data stream corresponding to P antenna ports. Matrix inherently have low rank. A known codeword is sent between the DU and RU and send indices in the codebook to determine which column to look at and a multiplier for each column.

As described above, frequency modulated IQ data can have "L" CSI-RS ports, where L is the number of layers associated with the data, and F tones before beamforming A=L×F matrix). After beamforming, the IQ data has P ports (each antenna) and F tones (B=P×F matrix). In digital beamforming, P2 is a P×L matrix where the rows of the matrix correspond to the number of ports, and columns correspond to the number of layers. This means that B=P2× A. In an embodiment of the disclosure then, the beamforming coefficients are compressed by adaptively quantizing each column of the beamforming matrix P2. Each column of P2 is quantized by $Q_1$ bits. $Q_1$ is communicated to the RU at the same time.

Each column of P2 can be decomposed into a linear combination of certain basis vectors. The basis vectors can be the columns of a P×P orthonormal matrix. As an example, the size P Fourier matrix can be used. Each column of P2 denoted as $P2_l$ for l going from 1 to L can be denoted as $$P2_k = \sum_{k=1}^{P} \alpha_k e^{-i\theta_k} V_k \qquad \text{Equation 1}$$

Where the set $\{V_k : k \in [1, 2, \ldots P]\}$ is the set of basis vectors that is known to both the baseband unit and the remote radio unit. The baseband unit then decides to send a subset S of the basis coefficients and the basis vector index. In effect the baseband unit quantizes and sends $\{k, \widehat{\alpha_k}, \widehat{\theta_k} : k \in S\}$. For example, S can be $\{1, 2, 5\}$ or any subset of the set $\{1, 2, \ldots L\}$. The hat operator can denote quantization. The remote radio unit can then reconstruct the beamforming matrix using the following:

$$\hat{P2}_k = \sum_{k \in S} \widehat{\alpha_k} e^{-i\widehat{\theta_k}} V_k \qquad \text{Equation 2}$$

The selection of the set S and the quantization can be decided by the baseband unit. In the least compressed version, the set S is the full set $\{1, 2, \ldots L\}$ and in that scenario the beamforming matrix is transmitted practically without any compression.

In Equation 1, the α and θ elements can be the beamforming coefficients, or the modifiers that weight the already known V, which is the basis vector/matrix that is known to both the DU and the RU. $V_k$ is the $k^{th}$ column of the basis matrix. So, for each antenna port P there is a set of beamforming coefficients α and θ that are used, in conjunction with the corresponding basis vector, to digitally beamform the data stream that corresponds to the port. These beamforming coefficients, a set of α and θ for each $k^{th}$ value, are sent along with the data to the remote radio unit.

In an embodiment, there can be three different types of precoders for massive MIMO systems. The number of columns first precorder P1 represents the number of CSI-RS ports defined for the UE. The second precoder P2 represents the port virtualization from baseband ports to the total number of digital antenna elements. The third precoder P3 represents the analog beamforming matrix. The generalized equation can be given by $$Y = H P3 P2 P1 x + n \qquad \text{Equation 3}$$

Where H is the precoding matrix. If the complete channel knowledge is available at the transmitter, this can then be done using a sounding reference signal or other means. For the ideal performance generalized system equation is given by:

$$Y = UDV'Px + n \qquad \text{Equation 4}$$

Where H is represented as the SVD and P is the combination of P3P2P1. The capacity can be archived if the precoder matrix P is equal to V. For simplicity assume P1 and P3 is a unit vector. Even though the SVD representation is optimal, we can minimize the representation of P2 based on port mapping. For example, each CSI-RS port can be mapped only on the all the co-polarized elements of a column, therefore P2 can be written as $$P2 = \begin{bmatrix} P2_1 & \Phi & \ldots & \Phi \\ \Phi & P2_2 & \ldots & \Phi \\ \vdots & \vdots & \ddots & \vdots \\ \Phi & \Phi & \ldots & P2_8 \end{bmatrix}$$

Where $\Phi$ is given is zero vector of size (8×1) and $P2_k$ is a (8×1) vector containing the mapping of the $k^{th}$ CSI RS port on the 8 TxRU the $k^{th}$ port is mapped on to. The channel matrix can be written as $$H = [h_1 h_2 \ldots h_8] \qquad \text{Equation 5}$$

Where the $h_k$ is an nx8 MIMO channel across the TxRUs of the kth CSI-RS port. Now we create a partial covariance matrix of the MIMO channel H as $$\Psi_{partial} = \begin{bmatrix} \Psi_1 & \Phi & \ldots & \Phi \\ \Phi & \Psi_2 & \ldots & \Phi \\ \vdots & \vdots & \ddots & \vdots \\ \Phi & \Phi & \ldots & \Psi_8 \end{bmatrix} = \begin{bmatrix} h_1^H h_1 & \Phi & \ldots & \Phi \\ \Phi & h_2^H h_2 & \ldots & \Phi \\ \vdots & \vdots & \ddots & \vdots \\ \Phi & \Phi & \ldots & h_8^H h_8 \end{bmatrix}$$

Where $\Phi$ now represents an 8×8 zero matrix. From the above, one can deduce that the channel covariance within the TxRU of a given CSI-RS port k is given by $\psi_k$. Therefore, the optimum precoder $P2_k$ for the kth CSI-RS port is given by the dominant Eigen vector of $\psi_k$ as shown below in Equation 6.

$$\psi_k = Q_k \Lambda_k Q_k^{-1} \qquad \text{Equation 6}$$

$$P2_k = Q_k \qquad (1)$$

Hence the main principle is to compute the SVD for each column and formulate the beamforming matrix. This can facilitate the beam space representation and compression such that the representation will reduce the signaling overhead from DU to RU. Let's define the basis vectors as DFT vectors which are known to the DU and RU. The basis vectors as DFT vectors can be:

$$U = [u_1 \quad u_2 \quad \ldots \quad u_8] \qquad \text{Equation 7}$$

$$u_k = \begin{bmatrix} 1 & e^{2\pi j \frac{k-1}{8}} & \ldots & e^{2\pi j \frac{7(k-1)}{8}} \end{bmatrix}^T$$

The basis vectors $u_k$ for a set of ortho-normal vectors. Since they are essentially DFT vectors this can also be seen as a basis vectors of the beam-space. In this beam space each $P2_k$ can be written as:

$$P2_k = \sum_{l=1}^{8} \alpha_{k,l} u_l$$

$$\alpha_{k,l} = u_l^H \cdot P2_k$$

Equation 8

Since there are a total of 8 basis vector each P2k can be expresses as a linear combination of the 8 basis vectors. Hence if the DU can compress the coefficients $\alpha_{k,l}$ for each $P2_k$. In addition, we can further compress the signalling between the DU and RU by choosing only 'M' values of $\alpha_{k,l}$ for each $P2_k$.

In an embodiment, there can be two methods for finding the best M from 8 basis vectors, where M is a portion of the 8 basis vectors.

For the first method, determine which M to use firstly. Say M=4, then 8c4, or 70, combinations are tested by the baseband unit/DU. Then for the second step, define precodersmall as the V of per port SVD.

for index=1: 8 CM
    correlation(index)=(PrecoderSmall'*P2i);
        metric(index)=sum(abs(correlation.^2)
);
end For the third step, choose $\alpha_{k,l}$ which gives the best M metric values or spectral efficiency or predicted SINR. For the third step, construct the precoder vector from the chosen alphas and the basis vectors, and then the precoder vector can be constructed from the chosen alpha values and the basis vectors.

This method can also be described thusly, the baseband unit can determine a group of beamforming coefficients for a stream of data, wherein the group of beamforming coefficients comprises respective subgroups of beamforming coefficients that correspond to respective basis vectors. The baseband unit device can also compute spectral efficiencies associated with portions of the subgroups of beamforming coefficients. The baseband unit device can also select a portion of the subgroups of beamforming coefficients with a highest spectral efficiency of the portions of the subgroups of the beamforming coefficients to add to a reduced size group of beamforming coefficients. The baseband unit device can also transmit the reduced size group of beamforming coefficients to a remote radio unit device to facilitate digital beamforming of a transmission to occur at the remote radio unit device.

The second method, which can be an extension of the first method, can be used in cases when the first method is highly computationally or is taking longer than a predefined amount of time, or has more than predefined number of combinations.

Figure 6:
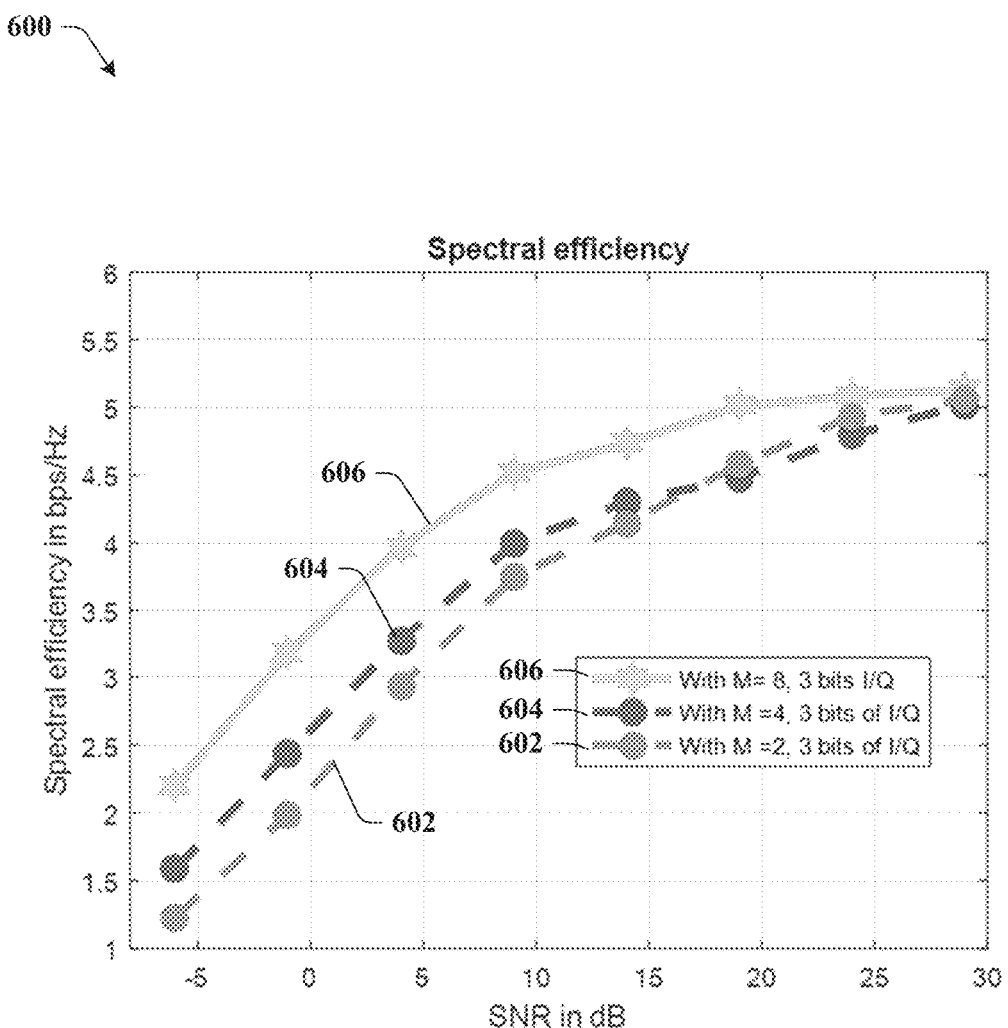
FIG. 6 illustrates a graph showing spectral efficiency of several different simulations in accordance with various aspects and embodiments of the subject disclosure.

The second method can also determine M, and then define alpha_basis_temp=U_Basis'*Precodesmall;. The second step is choose Choose $\alpha_{k,l}$ which gives the best M values of alpha_basis_temp. Then the precoder vector is constructed from the chosen alphas and the basis vectors. FIG. 6, shows the spectral efficiency of method 2, where M=4 604, and M=2 602, compared to the ideal M=8 606. As the M decreases, the spectral efficiency decreases, but only slightly, and approaches no difference as the SNR increases.

Figure 5:
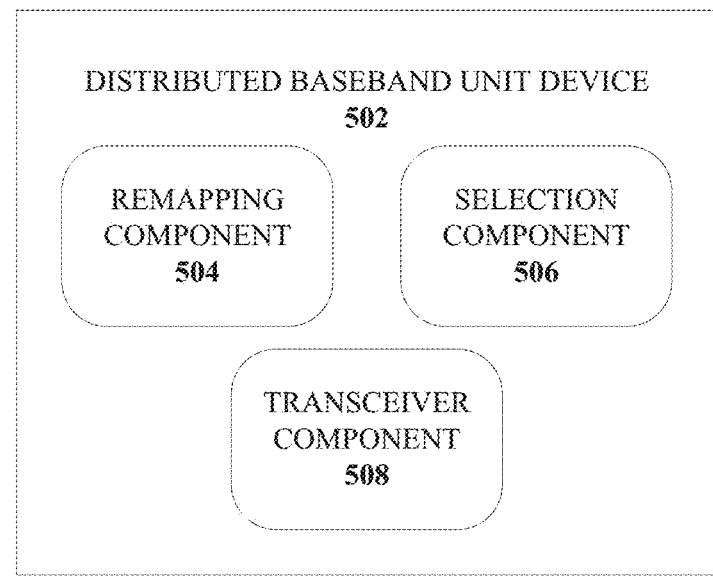
FIG. 5 illustrates an example baseband unit device in accordance with various aspects and embodiments of the subject disclosure.

Turning now to FIG. 5, illustrated is an example distributed baseband unit device in accordance with various aspects and embodiments of the subject disclosure.

The distributed baseband unit device 502 can include a remapping component 504 that can calculate the beamforming coefficients to apply to the IQ data for digital beamforming. The group of beamforming coefficients comprises respective subgroups of beamforming coefficients associated with respective antenna ports of a group of antenna ports.

A selection component 506 can be included that is configured to compute spectral efficiencies associated with portions of the subgroups of beamforming coefficients. The selection component 506 can also select a portion of the subgroups of beamforming coefficients with a highest spectral efficiency of the portions of the subgroups of the beamforming coefficients to add to a reduced size group of beamforming coefficients.

The selection component 506 can be based on the significance of the coefficients. For instance, if a coefficient is smaller than a predetermined value, or smaller than some predetermined level relative to the median or average value of the coefficients, the selection component 506 can ignore that coefficient and only send the larger coefficients. The absolute size or relative size of the coefficient relative to the median or average (or some other measure, e.g., standard deviation, etc.) can vary based on the available throughput and/or need for compression. In other embodiments number of coefficients selected can be inversely proportional to the number of layers or antenna ports. For an example, if a transmission has fewer layers, or is associated with fewer antenna ports, a higher percentage of the coefficients in the overall set of coefficients can be included in the transmission from the baseband unit to the remote radio unit.

The transceiver component 508 can be provided to transmit the compressed group of beamforming coefficients to a remote radio unit device to facilitate digital beamforming of a transmission to occur at the remote radio unit device.

Figure 7:
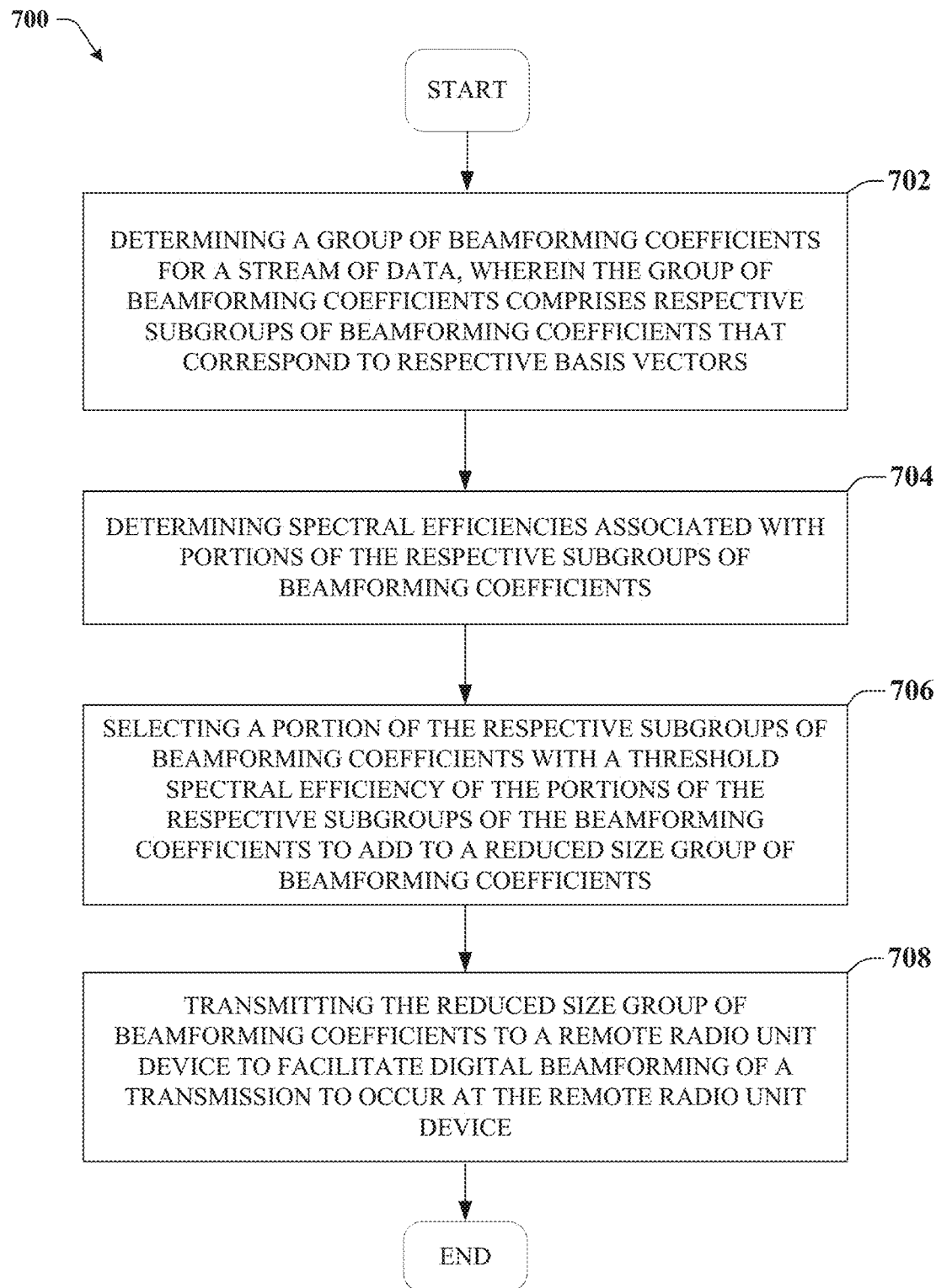
FIG. 7 illustrates an example method for determining precoding beamforming weight coefficients in accordance with various aspects and embodiments of the subject disclosure.
Figure 8:
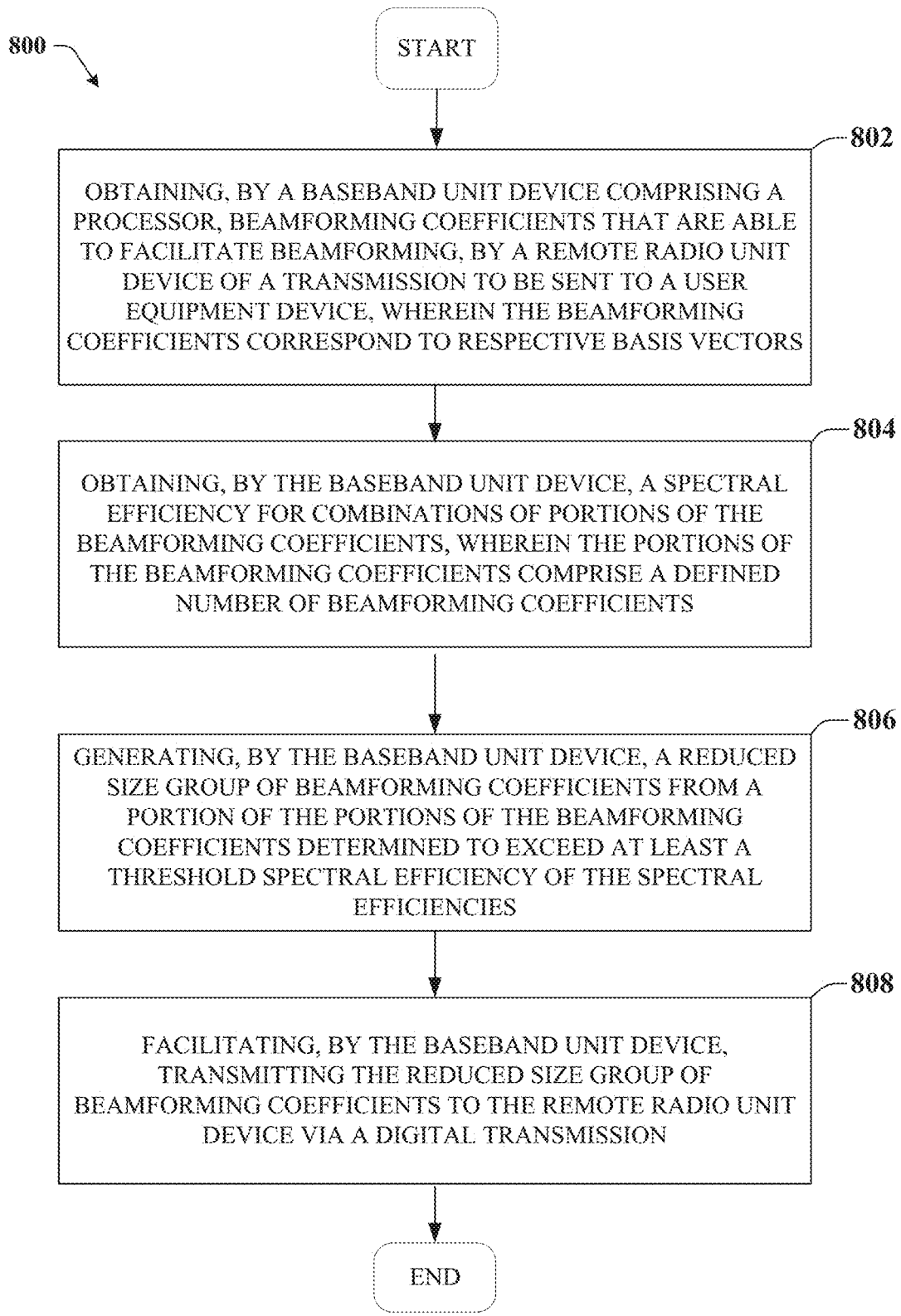
FIG. 8 illustrates an example method for determining precoding beamforming weight coefficients in accordance with various aspects and embodiments of the subject disclosure.

FIGS. 7-8 illustrates a process in connection with the aforementioned systems. The processes in FIGS. 7-8 can be implemented for example by the systems in FIGS. 1-5 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 illustrates an example method 700 for computing precoding beamforming weight coefficients in accordance with various aspects and embodiments of the subject disclosure.

Method 700 can begin at 702 where the method includes determining a group of beamforming coefficients for a stream of data, wherein the group of beamforming coefficients comprises respective subgroups of beamforming coefficients that correspond to respective basis vectors.

At 704, the method includes determining spectral efficiencies associated with portions of the respective subgroups of beamforming coefficients.

At 706, the method includes selecting a portion of the respective subgroups of beamforming coefficients with a threshold spectral efficiency of the portions of the respective subgroups of the beamforming coefficients to add to a reduced size group of beamforming coefficients.

At 708, the method includes transmitting the reduced size group of beamforming coefficients to a remote radio unit device to facilitate digital beamforming of a transmission to occur at the remote radio unit device.

FIG. 8 illustrates an example method 800 for computing precoding beamforming weight coefficients in accordance with various aspects and embodiments of the subject disclosure.

Method 800 can begin at 802 wherein the method includes obtaining, by a baseband unit device comprising a processor, beamforming coefficients that are able to facilitate beamforming, by a remote radio unit device of a transmission to be sent to a user equipment device, wherein the beamforming coefficients correspond to respective basis vectors.

At 804, the method can include obtaining, by the baseband unit device, a spectral efficiency for combinations of portions of the beamforming coefficients, wherein the portions of the beamforming coefficients comprise a defined number of beamforming coefficients.

At 806, the method can include generating, by the baseband unit device, a reduced size group of beamforming coefficients from a portion of the portions of the beamforming coefficients determined to exceed at least a threshold spectral efficiency of the spectral efficiencies.

At 808, the method includes facilitating, by the baseband unit device, transmitting the reduced size group of beamforming coefficients to the remote radio unit device via a digital transmission.

Figure 9:
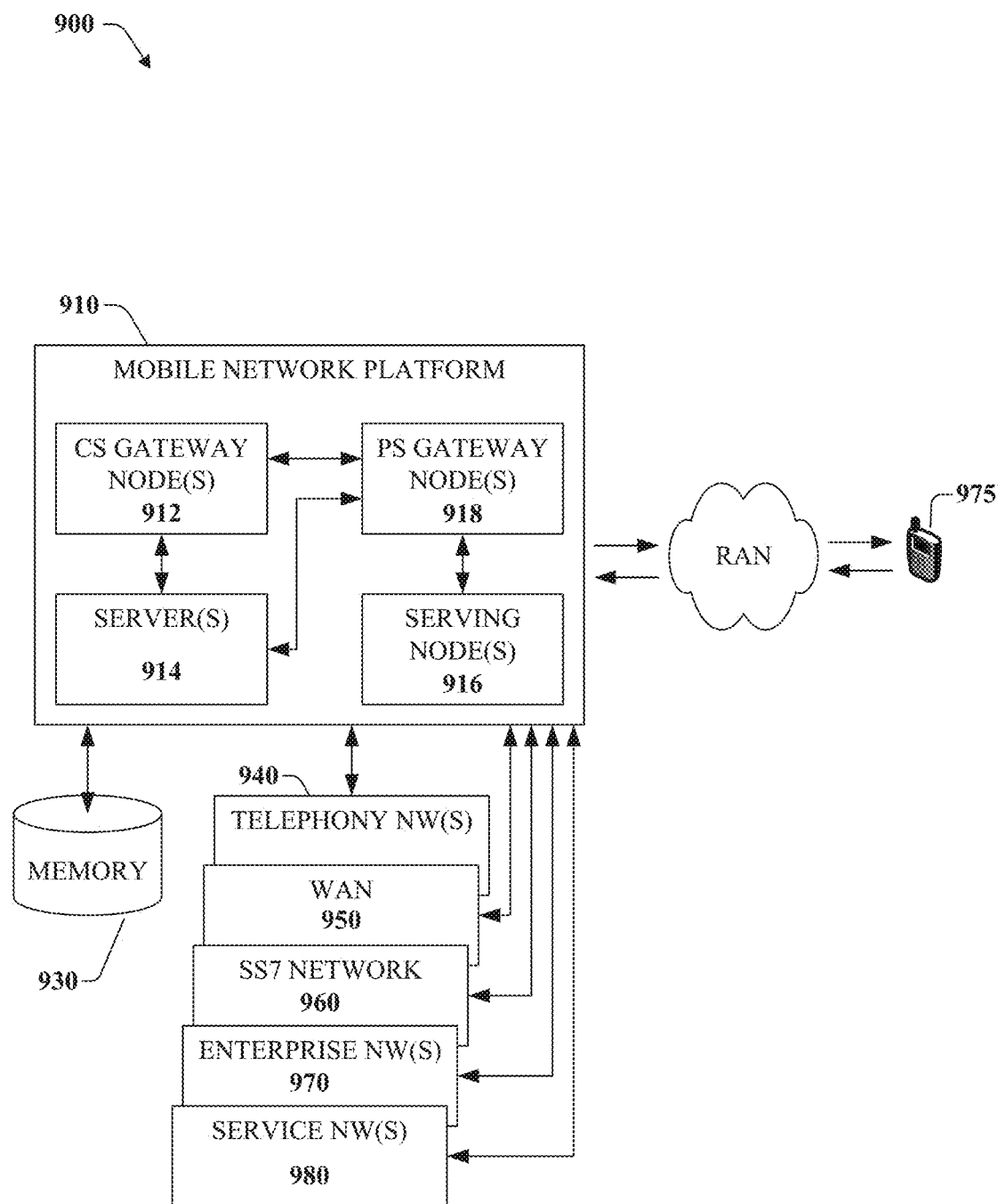
FIG. 9 illustrates an example block diagram of a non-limiting embodiment of a mobile network platform in accordance with various aspects described herein.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 960. Circuit switched gateway node(s) 912 can authorize and authenticate traffic (e.g., voice) arising from such networks. Additionally, CS gateway node(s) 912 can access mobility, or roaming, data generated through SS7 network 960; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication. Mobile network platform 910 can also include the MMEs, HSS/PCRFs, SGWs, and PGWs disclosed herein.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 970 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 970, or SS7 network 960. In an aspect, memory 930 can be, for example, accessed as part of a data store component or as a remotely connected memory store.

Figure 10:
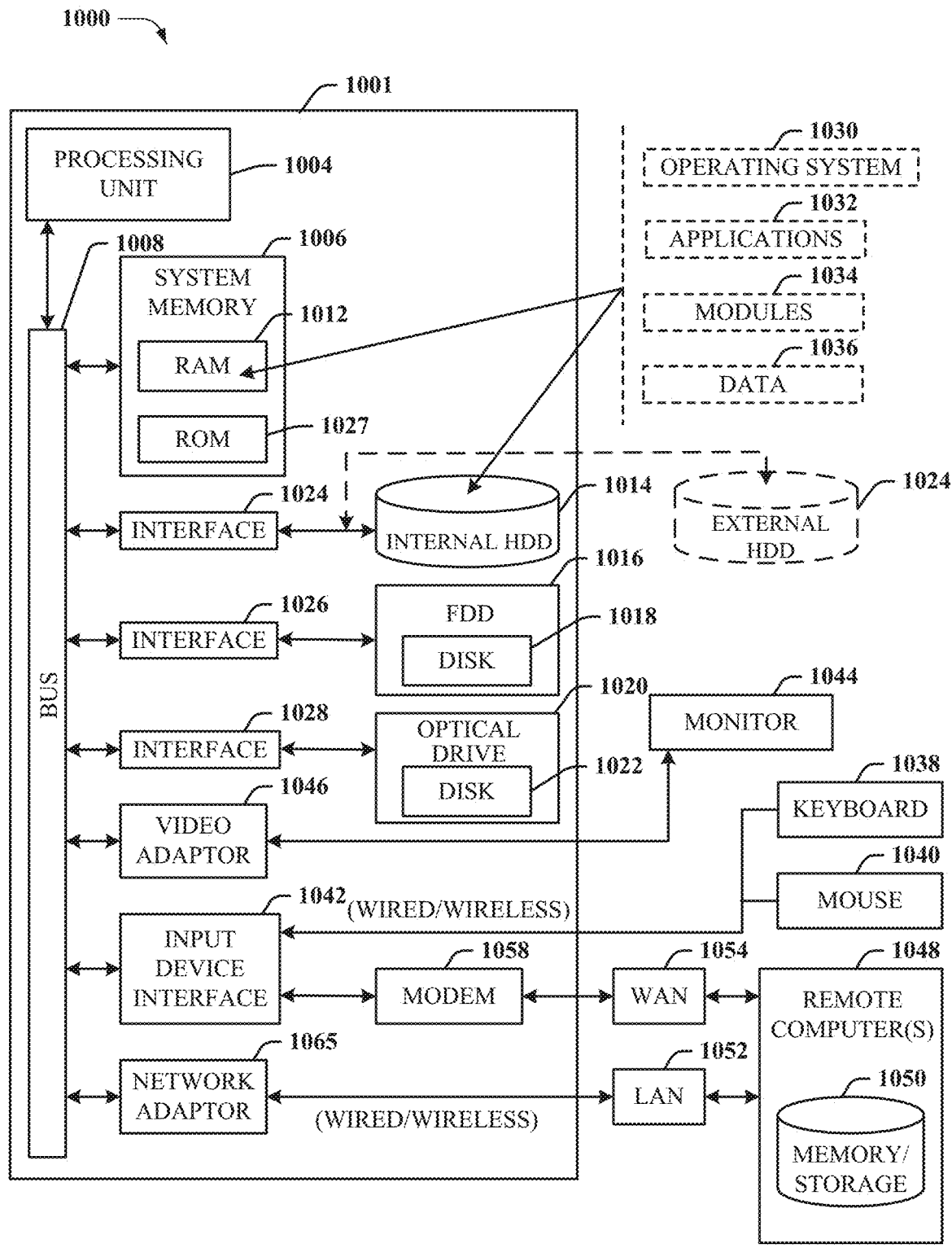
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 106, network node 206, e.g.,) or mobile edge computing device 108, 208, etc., may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring now to FIG. 10, there is illustrated a block diagram of a computer 1000 operable to execute the functions and operations performed in the described example embodiments. For example, a network node (e.g., network node 106, gNB 202, e.g.) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A baseband unit device, comprising:
    a processor; and
    a memory that stores executable instructions that, when executed by the processor, facilitate performance of operations, comprising:
        selecting a portion of respective subgroups of beamforming coefficients having a spectral efficiency that satisfies a threshold spectral efficiency, wherein the respective subgroups of beamforming coefficients correspond to respective basis vectors; and
        transmitting the portion of the respective subgroups of beamforming coefficients to a remote radio unit device to facilitate digital beamforming of a transmission to occur at the remote radio unit device.

2. The baseband unit device of claim 1, wherein portions of the respective subgroups of beamforming coefficients correspond to different combinations of a defined number of subgroups of beamforming coefficients, and the portions include the portion.

3. The baseband unit device of claim 1, wherein the spectral efficiency is based on a function comprising a singular value decomposition of a channel matrix.

4. The baseband unit device of claim 1, wherein the selecting the portion of the respective subgroups of beamforming coefficients further comprises selecting a subgroup of beamforming coefficients based on a criterion associated with magnitude.

5. The baseband unit device of claim 1, wherein a number of subgroups of beamforming coefficients in the portion of the respective subgroups of beamforming coefficients is based on a number of layers associated with the transmission.

6. The baseband unit device of claim 1, wherein the respective basis vectors are defined basis vectors common to the baseband unit device and the remote radio unit device.

7. The baseband unit device of claim 1, wherein the respective basis vectors are determined based on information associated with a transmission of a known codeword to the remote radio unit device.

8. A method, comprising:
    selecting, by a baseband unit device comprising a processor, a portion of respective subgroups of beamforming coefficients having a spectral efficiency that satisfies a threshold spectral efficiency, wherein the respective subgroups of beamforming coefficients correspond to respective basis vectors; and
    transmitting, by the baseband unit device, the portion of the respective subgroups of beamforming coefficients to a remote radio unit device to facilitate digital beamforming of a transmission to occur at the remote radio unit device.

9. The method of claim 8, wherein portions of the respective subgroups of beamforming coefficients correspond to different combinations of a defined number of subgroups of beamforming coefficients, and the portions include the portion.

10. The method of claim 8, wherein the spectral efficiency is based on a function comprising a singular value decomposition of a channel matrix.

11. The method of claim 8, wherein the selecting the portion of the respective subgroups of beamforming coefficients further comprises selecting a subgroup of beamforming coefficients based on a criterion associated with magnitude.

12. The method of claim 8, wherein a number of subgroups of beamforming coefficients in the portion of the respective subgroups of beamforming coefficients is based on a number of layers associated with the transmission.

13. The method of claim 8, wherein the respective basis vectors are defined basis vectors common to the baseband unit device and the remote radio unit device.

14. The method of claim 8, wherein the respective basis vectors are determined based on information associated with a transmission of a known codeword to the remote radio unit device.

15. A non-transitory machine-readable medium, comprising executable instructions that, when executed by a processor of a baseband unit device, facilitate performance of operations, comprising:
    selecting a portion of respective subgroups of beamforming coefficients having a spectral efficiency that meets a threshold spectral efficiency, wherein the respective subgroups of beamforming coefficients correspond to respective basis vectors; and
    transmitting the portion of the respective subgroups of beamforming coefficients to a remote radio unit device to facilitate digital beamforming of a transmission to occur at the remote radio unit device.

16. The non-transitory machine-readable machine-readable storage medium of claim 15, wherein portions of the respective subgroups of beamforming coefficients correspond to different combinations of a defined number of subgroups of beamforming coefficients, and the portions include the portion.

17. The non-transitory machine-readable medium of claim 15, wherein the spectral efficiency is based on a function comprising a singular value decomposition of a channel matrix.

18. The non-transitory machine-readable medium of claim 15, wherein the selecting the portion of the respective subgroups of beamforming coefficients further comprises selecting a subgroup of beamforming coefficients based on a criterion associated with magnitude.

19. The non-transitory machine-readable medium of claim 15, wherein a number of subgroups of beamforming coefficients in the portion of the respective subgroups of beamforming coefficients is based on a number of antenna ports associated with the transmission.

20. The non-transitory machine-readable medium of claim 15, wherein the respective basis vectors are defined basis vectors common to the baseband unit device and the remote radio unit device.

* * * * *